US008892499B2

(12) United States Patent
Phelan et al.

(10) Patent No.: US 8,892,499 B2
(45) Date of Patent: Nov. 18, 2014

(54) LIFE CYCLE MANAGEMENT OF RULE SETS

(75) Inventors: Thomas G. Phelan, Beaverton, OR (US); Brent W. Yardley, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 13/340,762

(22) Filed: Dec. 30, 2011

(65) Prior Publication Data
US 2013/0173527 A1  Jul. 4, 2013

(51) Int. Cl.
*G06N 5/02* (2006.01)

(52) U.S. Cl.
USPC .......................................................... 706/59

(58) Field of Classification Search
CPC .................................. G06Q 10/10; G06N 5/02
See application file for complete search history.

(56) References Cited

U.S. PATENT DOCUMENTS

| 7,987,325 | B1 | 7/2011 | Patil et al. | |
|---|---|---|---|---|
| 2003/0041131 | A1* | 2/2003 | Westerinen et al. | 709/221 |
| 2003/0236788 | A1* | 12/2003 | Kanellos et al. | 707/100 |
| 2004/0162741 | A1* | 8/2004 | Flaxer et al. | 705/7 |
| 2006/0059172 | A1* | 3/2006 | Devarakonda | 707/100 |
| 2006/0129978 | A1* | 6/2006 | Abrari et al. | 717/110 |
| 2007/0244897 | A1 | 10/2007 | Voskuil et al. | |
| 2007/0244932 | A1 | 10/2007 | Ahn et al. | |
| 2008/0178169 | A1 | 7/2008 | Grossner et al. | |
| 2009/0099882 | A1 | 4/2009 | Karabulut | |
| 2010/0043050 | A1 | 2/2010 | Nadalin et al. | |
| 2010/0057666 | A1* | 3/2010 | Ziegler et al. | 706/59 |
| 2010/0185963 | A1* | 7/2010 | Slik et al. | 715/764 |
| 2010/0217737 | A1 | 8/2010 | Shama | |
| 2010/0250320 | A1 | 9/2010 | Channabasavaiah et al. | |
| 2010/0269148 | A1 | 10/2010 | Almeida et al. | |

OTHER PUBLICATIONS

IBM; "A Method and Apparatus for Linkage Based Software Development Lifecycle Management", ip.com No. IPCOM000137130D, Jun. 9, 2006, pp. 1-18, ip.com, Country: Undisclosed, Disclosure File: English (United States).

* cited by examiner

*Primary Examiner* — Jeffrey A Gaffin
*Assistant Examiner* — Dave Misir
(74) *Attorney, Agent, or Firm* — Edward J. Lenart; Katherine S. Brown; Biggers Kennedy Lenart Spraggins LLP

(57) ABSTRACT

Life cycle management of rule sets, each rule set including rules for managing the operation of a computing system, including: identifying, by a life cycle management module, a rule life cycle state for each rule in the rule set, wherein the rule life cycle state specifies the current deployment status of the rule; identifying, by the life cycle management module, a linkage set for each rule in the rule set, wherein the linkage set identifies versions of the rule that are in a different rule life cycle state; and updating, by the life cycle management module, the rule set, including: updating the rule life cycle state for one or more rules in the rule set; and updating the linkage set for one or more rules in the rule set.

19 Claims, 6 Drawing Sheets

US 8,892,499 B2

LIFE CYCLE MANAGEMENT OF RULE SETS

BACKGROUND OF THE INVENTION

1. Field of the Invention

The field of the invention is data processing, or, more specifically, methods, apparatus, and products for life cycle management of rule sets.

2. Description of Related Art

Modern computing systems can be configured and operate through the use of rules that dictate the manner in which the computing system is configured and the manner in which the computing system operates. The life cycle of rule typically runs through three stages: a rule is created, a rule is deployed, and a rule is deleted. Any new rules, modified rules, or customized rules simply over-write current rules, so that existing rules may be unintentionally deleted.

SUMMARY OF THE INVENTION

Methods, apparatus, and products for life cycle management of rule sets, each rule set including rules for managing the operation of a computing system, including: identifying, by a life cycle management module, a rule life cycle state for each rule in the rule set, wherein the rule life cycle state specifies the current deployment status of the rule; identifying, by the life cycle management module, a linkage set for each rule in the rule set, wherein the linkage set identifies versions of the rule that are in a different rule life cycle state; and updating, by the life cycle management module, the rule set, including: updating the rule life cycle state for one or more rules in the rule set; and updating the linkage set for one or more rules in the rule set.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
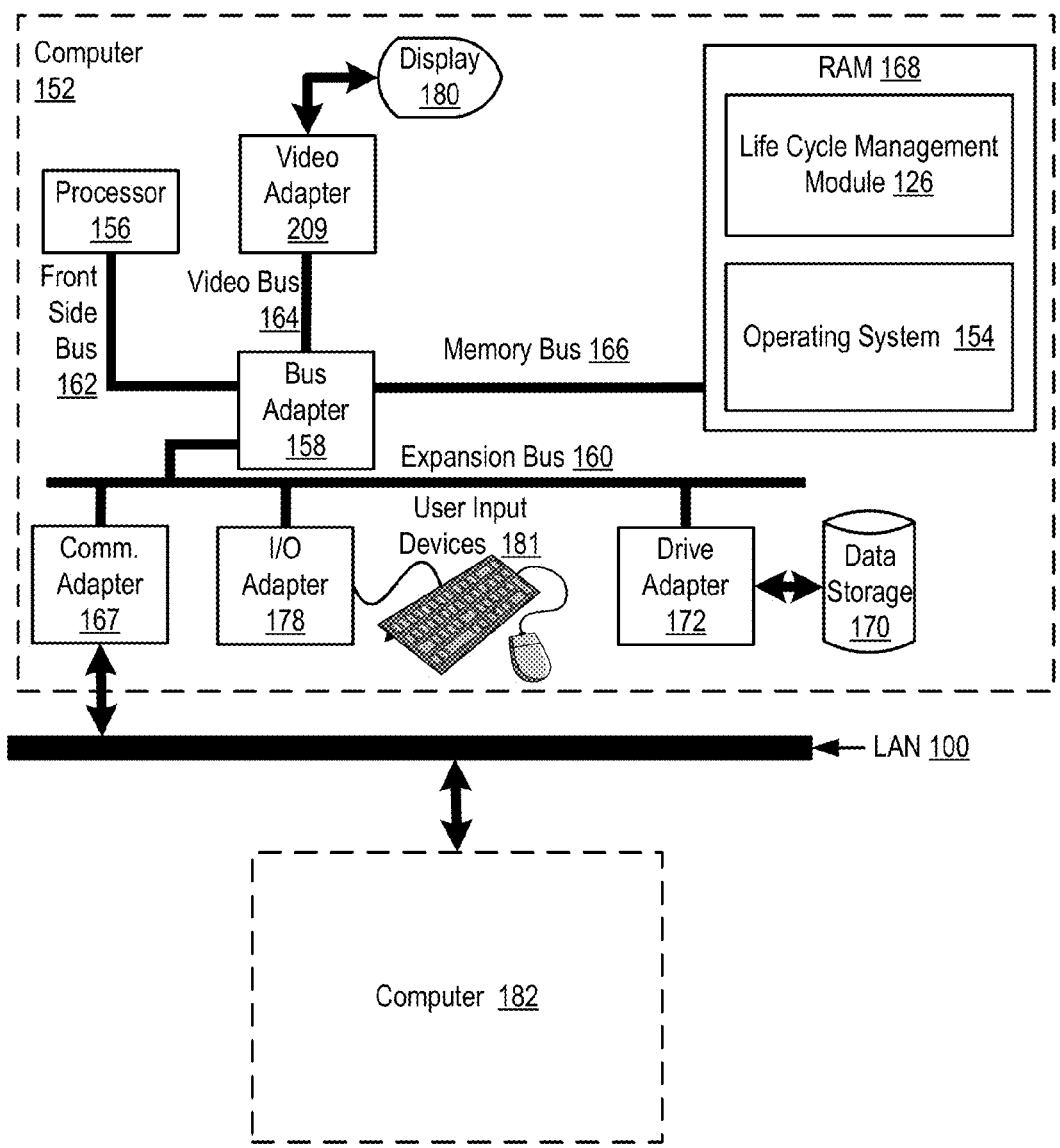
FIG. 1 sets forth a block diagram of automated computing machinery comprising an example computer useful in life cycle management of rule sets according to embodiments of the present invention.

Example methods, apparatus, and products for life cycle management of rule sets in accordance with the present invention are described with reference to the accompanying drawings, beginning with FIG. 1. FIG. 1 sets forth a block diagram of automated computing machinery comprising an example computer (152) useful in life cycle management of rule sets according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a life cycle management module (126), a module of computer program instructions for life cycle management of rule sets according to embodiments of the present invention. In the example of FIG. 1, the life cycle management module (126) is a module of computer program instructions that, when executed, carries out life cycle management of rule sets (300) according to embodiments of the present invention. The life cycle management module (126) of FIG. 1 may be embodied, for example, as a stand-alone module of computer program instructions or, alternatively, as a module of computer program instructions that is part of a larger computing system management module or computing system configuration module.

In the example of FIG. 1, each rule set includes one or more rules for managing the operation of a computing system. The rules may dictate the manner in which the computing system is configured or operates. For example, a first rule may specify that a host bus adapter in the computing system must have two ports that are connected to computer storage devices. Another rule may specify, for example, that if a computing system has a particular operating system installed on the computing system and has a particular type of data communications adapter installed on the computing system, the system must include a particular version of firmware. Other rules will occur to those of skill in the art and are within embodiments of the present invention.

The life cycle management module (126) of FIG. 1 is configured to identify a rule life cycle state for each rule in the rule set. The rule life cycle state specifies the current deployment status of a rule. The current deployment status of a rule identifies the current stage in the life cycle of a rule that the rule is currently within. The life cycle management module (126) of FIG. 1 may identify a rule life cycle state for each rule in the rule set, for example, by inspecting a data descriptor or other data structure that associates a rule with the current rule life cycle state for the rule. The current rule life cycle state for the rule may be contained, for example, as a field in a particular object that contains the implementation of the rule. Alternatively, the current rule life cycle state for the rule may be contained in a rule state or other data structure as will occur to those of skill in the art.

The life cycle management module (126) of FIG. 1 is also configured to identify a linkage set for each rule in the rule set. The linkage set identifies versions of the rule that are in a different rule life cycle state. Consider an example in which a rule identified as 'Rule A' is created that stipulates that a host bus adapter in a computing system must have two ports that are coupled to computer memory. The user of the computing system may determine that, for the user's particular implementation, the host bus adapter must have four ports that are coupled to computer memory. In such an example, the user may create a copy of Rule A that is identified as 'Rule A2.' The user may subsequently modify Rule A2 such that the rule stipulates that a host bus adapter in a computing system must have four ports that are coupled to computer memory. In such an example, Rule A would be identified as being part of the linkage set of Rule A2. Rule A2 would similarly be identified as being part of the linkage set of Rule A. Furthermore, Rule A2 will inherit any properties of Rule A and Rule A2 will become the active rule in the configuration whereas Rule A will become inactive.

The life cycle management module (126) of FIG. 1 is also configured to update the rule set. Updating the rule set may be carried out, for example, by adding new rules to the rule set. The new rules may be rules that represent a modification to an existing rule, a new rule that is entirely unrelated to any of the existing rules, and so on. Readers will appreciate that updating the rule set cannot be carried out by simply overwriting the rules in the rule set, even if a new rule represents a modification of an existing rule in the rule set.

In the example of FIG. 1, the life cycle management module (126) is configured to update the rule set by updating the rule life cycle state for one or more rules in the rule set. As described above, rules are not updated by simply overwriting the rule, even if a new rule represents a modification of an existing rule. Consider an example in which a new rule is a modified version of a particular rule in the rule set. In such an example, the new rule may be added to the rule set and the life cycle state for the new rule may be changed to 'activation' while the life cycle state for the original rule may be changed to 'deprecation.' In such an example, the computing system will operate by applying the new rule during operations. Alternatively, the user of a computing system may determine that they do not want to apply the new rule as the original rule may contain modifications that are specific and useful to the operation of their particular computing system. In such an example, the life cycle state for the new rule may be changed to 'deprecation' while the life cycle state for the original rule may remain 'activation.' In such an example, the computing system will operate by applying the original rule during operations.

In the example of FIG. 1, the life cycle management module (126) is further configured to update the rule set by updating the linkage set for one or more rules in the rule set. Updating the linkage set for one or more rules in the rule set may be carried out, for example, by including new rules that were added to the rule set into the linkage set of a previously existing rule, by removing rules that have been transitioned into the 'exclusion' life cycle state from the linkage set of all rules in the rule set, and so on. Consider an example in which a new rule, Rule B2, is a modified version of a rule, Rule B, which was already part of the rule set. In such an example, the Rule B2 would be added to the linkage set of Rule B and Rule B would be added to the linkage set of Rule B2.

Also stored in RAM (168) is an operating system (154). Operating systems useful life cycle management of rule sets according to embodiments of the present invention include UNIX™ Linux™ Microsoft XP™ AIX™ IBM's i5/OS™ and others as will occur to those of skill in the art. The operating system (154) and the life cycle management module (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for life cycle management of rule sets according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for life cycle management of rule sets according to embodiments of the present invention include modems for wired dial-up communications, Ethernet (IEEE 802.3) adapters for wired data communications network communications, and 802.11 adapters for wireless data communications network communications.

Figure 2:
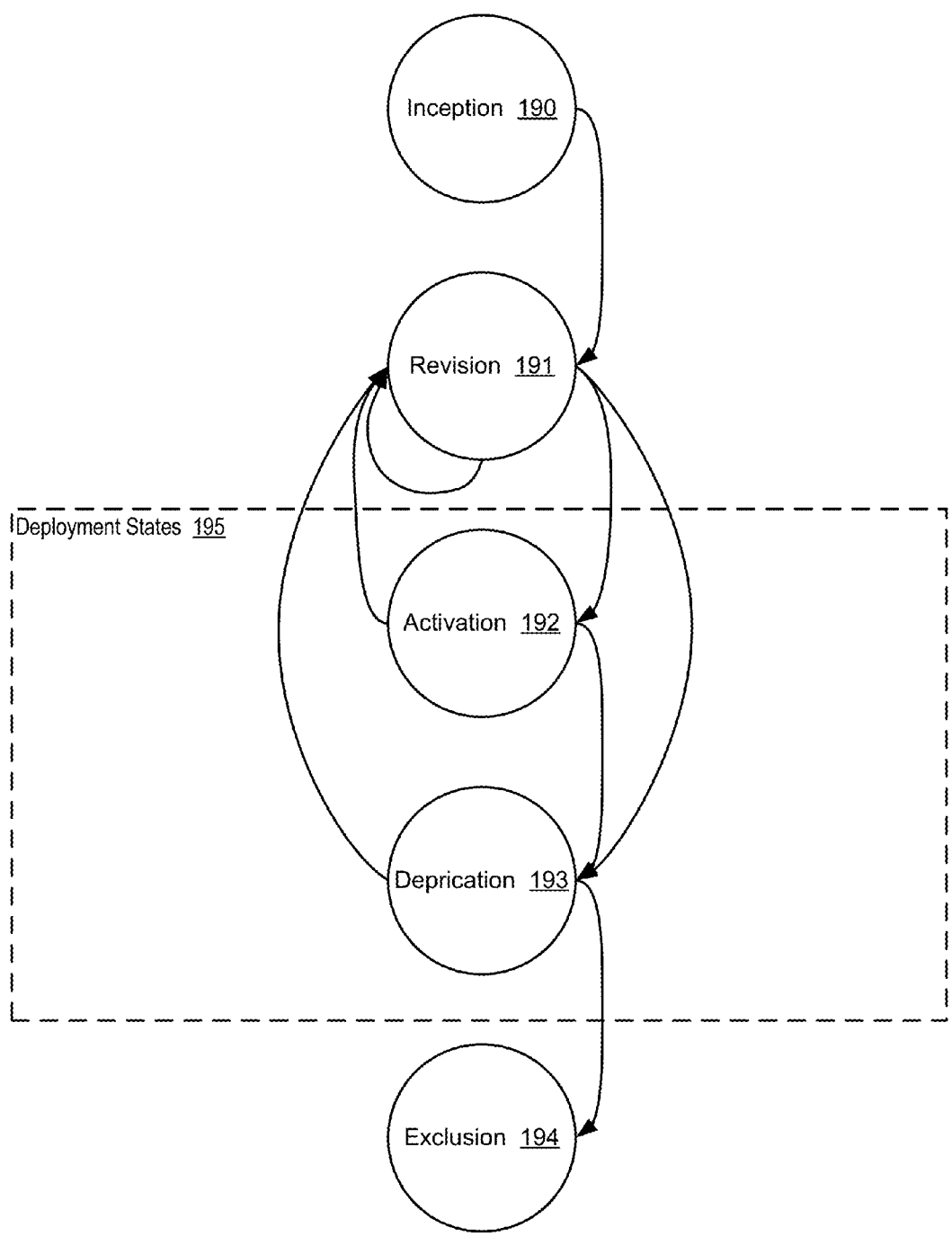
FIG. 2 sets forth a graph illustrating rule life cycle states that a rule may be within at a particular point in time.

For further explanation, FIG. 2 sets forth a graph illustrating rule life cycle states that a rule may be within at a particular point in time. In the example of FIG. 2, the current deployment status of a rule may be one of the five following rule life cycle states: inception, revision, activation, deprecation, or exclusion.

In the example method of FIG. 2, the 'inception' rule life cycle state (190) is a state in which the rule is first created. A rule that is in the 'inception' rule life cycle state (190) has been conceptualized and even embodied, for example, as a module of computer program instructions. A rule that is in the 'inception' rule life cycle state (190), however, is a rule that has never been deployed into an operating environment for a computing system.

In the example method of FIG. 2, the 'revision' rule life cycle state (191) is a state in which the rule has been conceptualized and created and is now available for revisions. A rule that is in the 'revision' rule life cycle state (191) is not currently deployed but may be ready for deployment after it has been revised. If a rule has previously been deployed and is in need of modification, the rule must be returned to the 'revision' rule life cycle state (191) before it is revised and must remain in this state until the rule is redeployed.

In the example method of FIG. 2, the 'activation' rule life cycle state (192) is the first of two deployment states (195) in which the rule can be deployed. A rule that is in the 'activation' rule life cycle state (192) is current and has been revised as necessary. All rules in this state are fully supported and can be cloned or copied by a user to create custom variations of the rule.

In the example method of FIG. 2, the 'deprecation' rule life cycle state (193) is the second of the two deployment states (195) in which the rule can be deployed. A rule that is in the 'deprecation' rule life cycle state (193) is being prepared for exclusion. All rules in this state cannot be cloned or copied by a user to create custom variations of the rule.

In the example method of FIG. 2, the 'exclusion' rule life cycle state (194) is the final state in the life cycle of a rule. A rule that is in the 'exclusion' rule life cycle state (194) cannot be cloned or copied by a user to create custom variations of the rule. Likewise, rule that is in the 'exclusion' rule life cycle state (194) cannot be linked to any other rules and cannot be deployed.

Rules which are in the revision, activation or deprecation states can be clone or copied. Rules can only be deployed in the activation or deprecation states. When a rule is cloned or copied, its initial state is set to inception.

Figure 3:
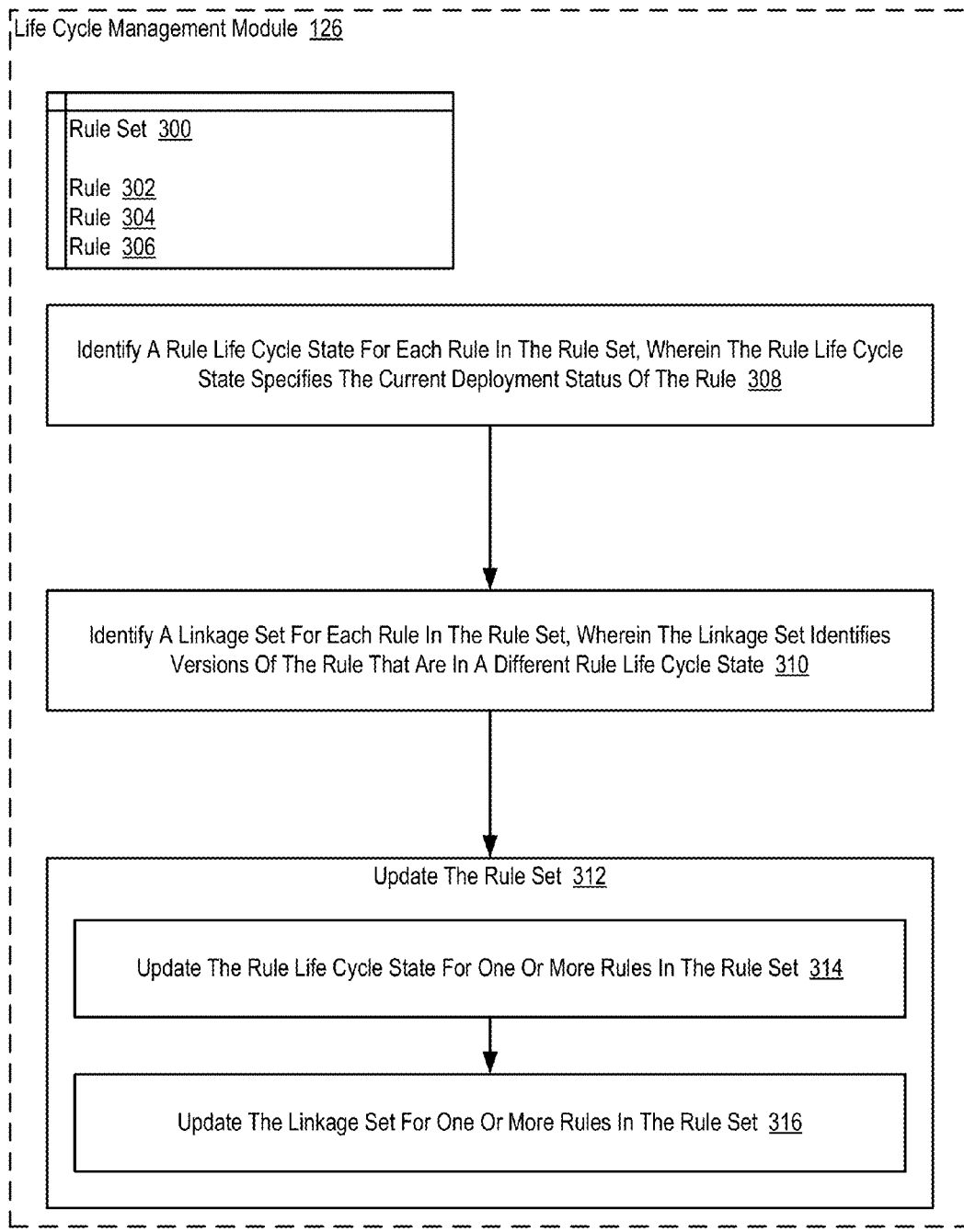
FIG. 3 sets forth a flow chart illustrating an example method for life cycle management of rule sets according to embodiments of the present invention.

For further explanation, FIG. 3 sets forth a flow chart illustrating an example method for life cycle management of rule sets (300) according to embodiments of the present invention. In the example method of FIG. 3, the rule set (300) includes one or more rules (302, 304, 306) for managing the operation of a computing system. The rules (302, 304, 306) may dictate the manner in which the computing system is configured or operates. For example, a first rule may specify that a host bus adapter in the computing system must have two ports that are connected to computer storage devices. Another rule may specify, for example, that if a computing system has a particular operating system installed on the computing system and has a particular type of data communications adapter installed on the computing system, the system must include a particular version of firmware. Other rules will occur to those of skill in the art and are within embodiments of the present invention.

The example method of FIG. 3 includes identifying (308), by a life cycle management module (126), a rule life cycle state for each rule (302, 304, 306) in the rule set (300). In the example method of FIG. 3, the life cycle management module (126) is a module of computer program instructions that, when executed, carries out life cycle management of rule sets (300) according to embodiments of the present invention. The life cycle management module (126) of FIG. 3 may be embodied, for example, as a stand-alone module of computer program instructions or, alternatively, as a module of computer program instructions that is part of a larger computing system management module or computing system configuration module.

In the example method of FIG. 3, the rule life cycle state specifies the current deployment status of a rule (302, 304, 306). The current deployment status of a rule (302, 304, 306) identifies the current stage in the life cycle of a rule that the rule (302, 304, 306) is currently within. In the example method of FIG. 3, identifying (308) a rule life cycle state for each rule (302, 304, 306) in the rule set (300) may be carried out, for example, by inspecting a data descriptor or other data structure that associates a rule (302, 304, 306) with the current rule life cycle state for the rule (302, 304, 306). In the example method of FIG. 3, the current rule life cycle state for the rule (302, 304, 306) may be contained, for example, as a field in a particular object that contains the implementation of the rule. Alternatively, the current rule life cycle state for the rule (302, 304, 306) may be contained in a rule state table as shown below:

TABLE 1

Rule State Table

| Rule Identifier | Rule State |
|---|---|
| A | Inception |
| B | Deprecation |
| C | Activation |
| D | Activation |
| E | Exclusion |
| F | Revision |

The rule state table depicted above has entries for six rules: rule A, rule B, rule C, rule D, rule E, and rule F. Each entry in the rule state table also identifies the current rule life cycle state for each of the six rules. As rules are moved into different states, the corresponding entry in the rule state table can be updated to show the new current rule life cycle state for the rule.

The example method of FIG. 3 also includes identifying (310), by the life cycle management module (126), a linkage set for each rule (302, 304, 306) in the rule set (300). In the example method of FIG. 3, the linkage set identifies versions of the rule (302, 304, 306) that are in a different rule life cycle state. Consider an example in which a rule identified as 'Rule A' is created that stipulates that a host bus adapter in a computing system must have two ports that are coupled to computer memory. The user of the computing system may determine that, for their particular use and implementation, the host bus adapter must have four ports that are coupled to computer memory. In such an example, the user may create a copy of Rule A that is identified as 'Rule A2.' The user may subsequently modify Rule A2 such that the rule stipulates that a host bus adapter in a computing system must have four ports that are coupled to computer memory. In such an example, Rule A would be identified (310) as being part of the linkage set of Rule A2. Rule A2 would similarly be identified (310) as being part of the linkage set of Rule A.

The example method of FIG. 3 also includes updating (312), by the life cycle management module (126), the rule set (300). In the example method of FIG. 3, updating (312) the rule set (300) may be carried out, for example, by adding new rules to the rule set (300). The new rules may be rules that represent a modification to an existing rule (302, 304, 306), a new rule that is entirely unrelated to any of the existing rules (302, 304, 306), and so on. Readers will appreciate that updating (312) the rule set (300) cannot be carried out by simply overwriting the rules (302, 304, 306) in the rule set (300), even if a new rule represents a modification of an existing rule (302, 304, 306) in the rule set (300).

In the example method of FIG. 3, updating (312) the rule set (300) includes updating (314) the rule life cycle state for one or more rules (302, 304, 306) in the rule set (300). In the example method of FIG. 3, as described above, rules (302, 304, 306) are not updated by simply overwriting the rule (302, 304, 306), even if a new rule represents a modification of an existing rule (302, 304, 306). Consider an example in which a new rule is a modified version of a particular rule (302) in the rule set (300). In such an example, the new rule may be added to the rule set (300) and the life cycle state for the new rule may be changed to 'activation' while the life cycle state for the original rule (302) may be changed to 'deprecation.' In such an example, the computing system will operate by applying the new rule during operations. Alternatively, the user of a computing system may determine that they do not want to apply the new rule as the original rule (302) may contain modifications that are specific and useful to the operation of their particular computing system. In such an example, the life cycle state for the new rule may be changed to 'deprecation' while the life cycle state for the original rule (302) may remain 'activation.' In such an example, the computing system will operate by applying the original rule (302) during operations.

In the example method of FIG. 3, updating (312) the rule set (300) also includes updating (316) the linkage set for one or more rules (302, 304, 306) in the rule set (300). In the example method of FIG. 3, updating (316) the linkage set for one or more rules (302, 304, 306) in the rule set (300) may be carried out, for example, by including new rules that were added to the rule set (300) into the linkage set of a previously existing rule, by removing rules that have been transitioned into the 'exclusion' life cycle state from the linkage set of all rules in the rule set (300), and so on. Consider an example in which a new rule is a modified version of a particular rule (302) in the rule set (300). In such an example, the new rule would be added to the linkage set of the particular rule (302) in the rule set (300).

Figure 4:
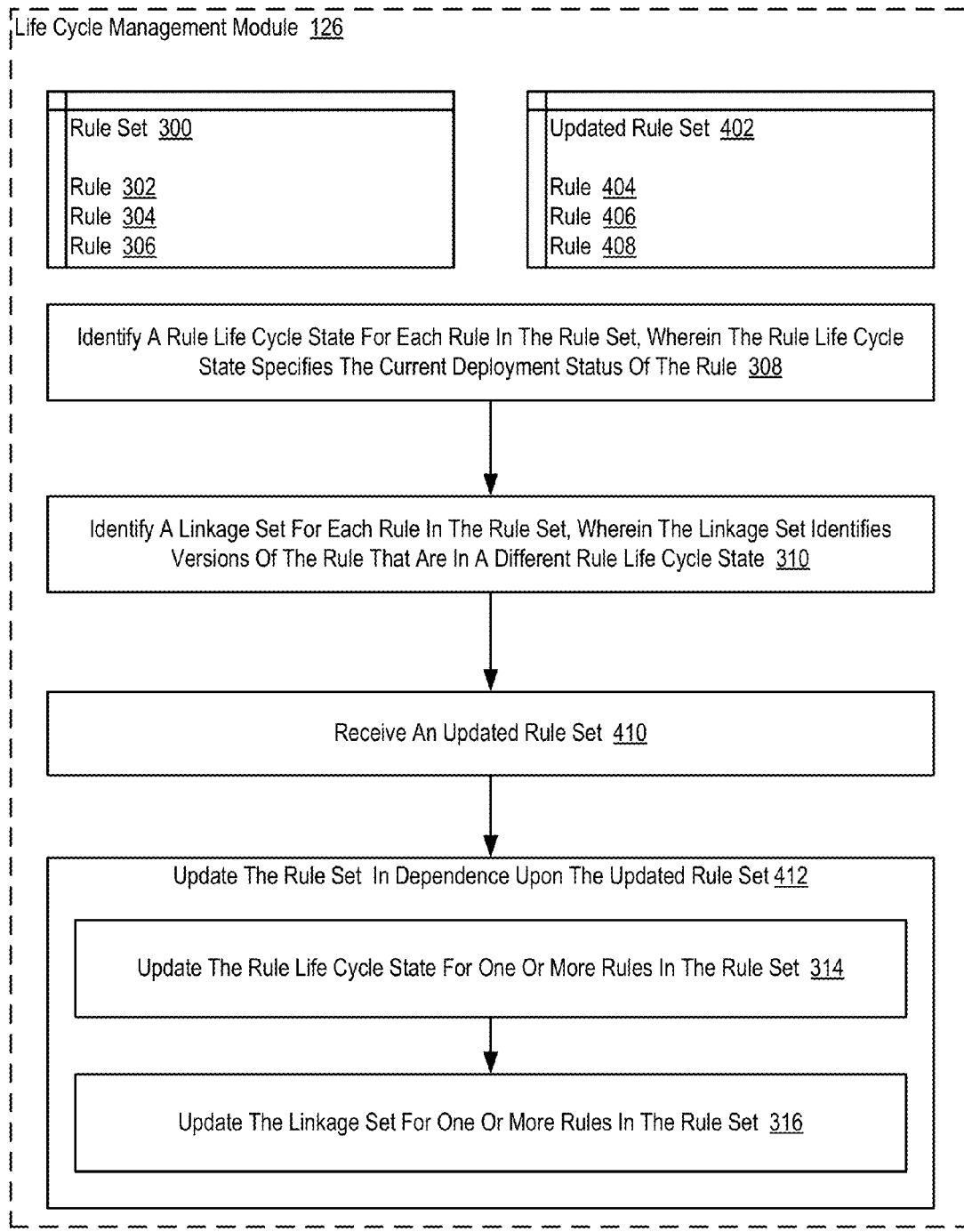
FIG. 4 sets forth a flow chart illustrating a further example method for life cycle management of rule sets according to embodiments of the present invention.

For further explanation, FIG. 4 sets forth a flow chart illustrating a further example method for life cycle management of rule sets (300, 402) according to embodiments of the present invention. The example method of FIG. 4 is similar to the example method of FIG. 3 as it also includes identifying (308) a rule life cycle state for each rule (302, 304, 306) in the rule set (300) and identifying (310) a linkage set for each rule (302, 304, 306) in the rule set (300).

The example method of FIG. 4 also includes receiving (410), by the life cycle management module (126), an updated rule set (402). In the example method of FIG. 4, the updated rule set (402) includes one or more rules (404, 406, 408) for managing the operation of a computing system. The updated rule set (402) may include new rules (404, 406, 408) that have no corresponding rule (302, 304, 306) in the rule set (300). Alternatively, the updated rule set (402) may include rules (404, 406, 408) that represent modifications of rules (302, 304, 306) in the rule set (300). Readers will appreciate that the updated rule set (402) may be embodied entirely as a new set of rules, entirely as a set of modified rules, or any combination thereof.

The example method of FIG. 4 also includes updating (412), by the life cycle management module (126), the rule set (300) in dependence upon the updated rule set (402). In the example method of FIG. 4, updating (412) the rule set (300) in dependence upon the updated rule set (402) may be carried out, for example, by adding all of the rules (404, 406, 408) in the updated rule set (402) to the rule set (300) such that the rule set (300) includes all of the rules (404, 406, 408) in the updated rule set (402) in addition to those rules (302, 304, 306) that were already in the rule set (300). Readers will appreciate that updating (412) the rule set (300) in dependence upon the updated rule set (402) cannot be carried out by simply overwriting the rules (302, 304, 306) in the rule set (300), even if rules (404, 406, 408) in the updated rule set (402) represent modifications of the rules (302, 304, 306) in the rule set (300).

In the example method of FIG. 4, updating (412) the rule set (300) in dependence upon the updated rule set (402) includes updating (314) the rule life cycle state for one or more rules (302, 304, 306) in the rule set (300). In the example method of FIG. 4, as described above, rules (302, 304, 306) are not updated by simply overwriting the rule (302, 304, 306) with a rule (404, 406, 408) contained in the updated rule set (402). Instead, updating (412) the rule set (300) is carried by changing the rule life cycle state for one or more rules (302, 304, 306) in the rule set (300) such that the updated rule is in the activated state while the prior version of the rule is deprecated.

Consider an example in which a particular rule (404) in the updated rule set (402) is a modified version of a particular rule (302) in the rule set (300). In such an example, the modified rule (404) may be added to the rule set (300) and the life cycle state for the modified rule (404) may be changed to 'activation' while the life cycle state for the original rule (302) may be changed to 'deprecation.' In such an example, the computing system will operate by applying the modified rule (404) during operations. Alternatively, the user of a computing system may determine that they do not want to apply the modified rule (404) as the original rule (302) may contain modifications that are specific and useful to the operation of their particular computing system. In such an example, the life cycle state for the modified rule (404) may be changed to 'deprecation' while the life cycle state for the original rule (302) may remain 'activation.' In such an example, the computing system will operate by applying the original rule (302) during operations. Alternatively, the computer system can make the decision based on the linkage and life cycle state such that if a new rule is meant to deprecate an existing rule, the existing rule would remain active while the new rules, while still in the activation state, are not applied. This allows the computing system to automatically conflict resolve the rule set application.

In the example method of FIG. 4, updating (412) the rule set (300) in dependence upon the updated rule set (402) also includes updating (316) the linkage set for one or more rules (302, 304, 306) in the rule set (300). In the example method of FIG. 4, updating (316) the linkage set for one or more rules (302, 304, 306) in the rule set (300) may be carried out, for example, by including rules (404, 406, 408) in the updated rule set (402) into the linkage set of a previously existing rule (302, 304, 306) in the rule set (300), by removing rules that have been transitioned into the 'exclusion' life cycle state from the linkage set of all rules in the rule set (300), and so on. Consider an example in which a rule (404) in the updated rule set (402) is a modified version of a particular rule (302) in the rule set (300). In such an example, the rule (404) in the updated rule set (402) would be added to the linkage set of the particular rule (302) in the rule set (300).

Figure 5:
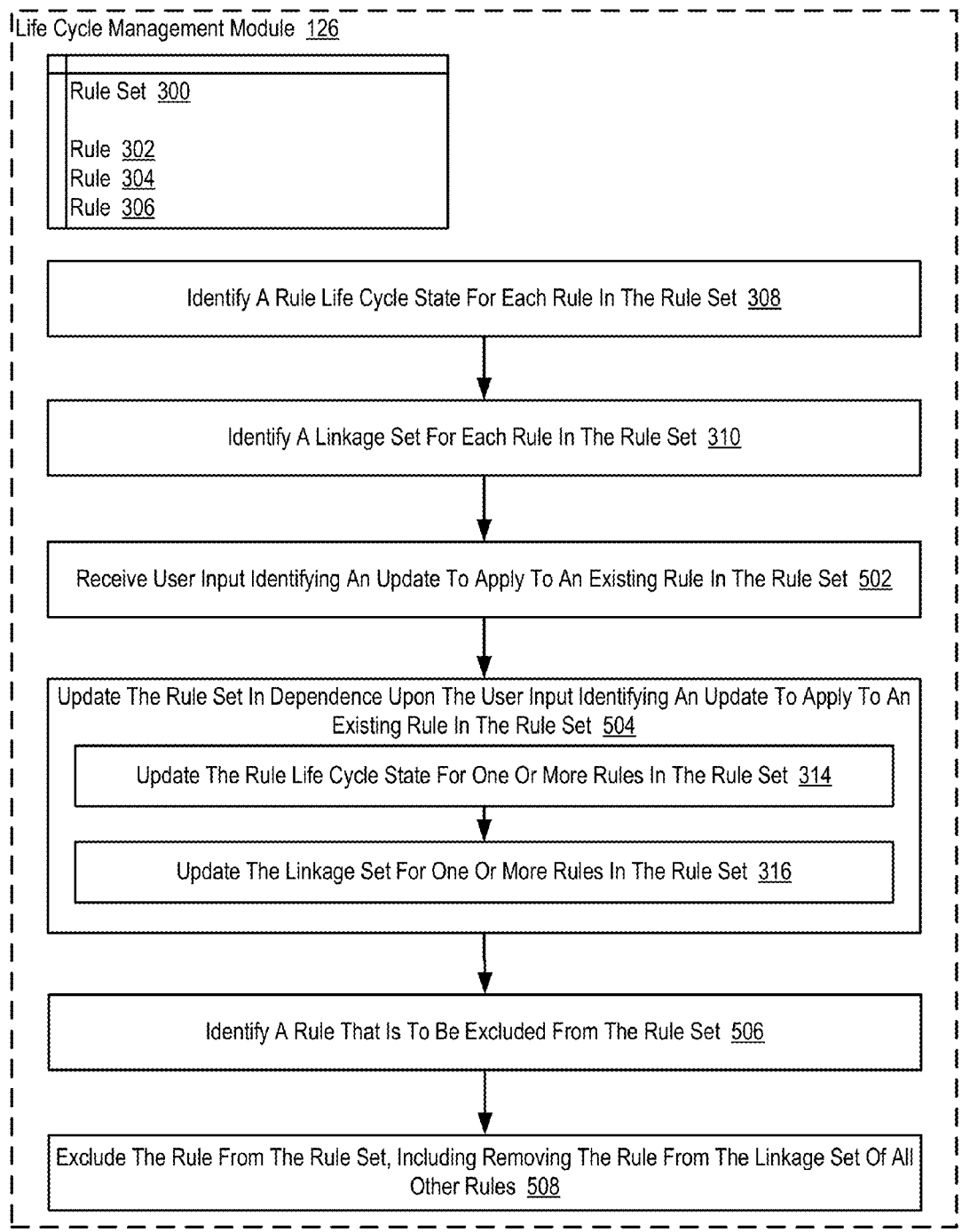
FIG. 5 sets forth a flow chart illustrating a further example method for life cycle management of rule sets according to embodiments of the present invention.

For further explanation, FIG. 5 sets forth a flow chart illustrating a further example method for life cycle management of rule sets according to embodiments of the present invention. The example method of FIG. 5 is similar to the example method of FIG. 3 as it also includes identifying (308) a rule life cycle state for each rule (302, 304, 306) in the rule set (300) and identifying (310) a linkage set for each rule (302, 304, 306) in the rule set (300).

The example method of FIG. 5 also includes receiving (502), by the life cycle management module (126), user input identifying an update to apply to an existing rule (302, 304, 306) in the rule set (300). In the example method of FIG. 5, user input identifying an update to apply to an existing rule (302, 304, 306) in the rule set (300) may be provided to the life cycle management module (126), for example, through a graphical user interface that is presented to the user. The user input identifying an update to apply to an existing rule (302, 304, 306) in the rule set (300) may include, for example, an identification of the rule to update, an identification a variable that is used by the rule that is to be updated, a new value for the variable that is used by the rule that is to be updated, and so on. Furthermore, if automatic conflict resolution was used based on linkage and rule state, the user interface would present the user information identifying changes that were made, as well as information identifying which rules are currently in the deployment state and which rules are active.

In the example method of FIG. 5, updating (504) the rule set (300) includes updating the rule set (300) in dependence upon the user input identifying an update to apply to an existing rule (302, 304, 306) in the rule set (300). In the example method of FIG. 5, updating the rule set (300) in dependence upon the user input identifying an update to apply to an existing rule (302, 304, 306) in the rule set (300) may be carried out, for example, by identifying the particular rule (302, 304, 306) that the user is attempting to update through the use of a rule identifier and subsequently creating a copy of the particular rule (302, 304, 306) that the user is attempting to update. The copy of the particular rule (302, 304, 306) that the user is attempting to update may be modified in accordance with the user input and treated as a new rule in the rule set (300). Consider an example in which a rule specifies the maximum number of virtual machines that may be executing on a computing system at a given time. In such an example, a user may attempt to modify this rule through the use of a user interface that allows the user to specify the maximum number of virtual machines that may be executing on a computing system at a given time. In such an example, the life cycle management module (126) can make a copy of the rule that specifies the maximum number of virtual machines that may be executing on a computing system at a given time and update the copied rule to include the user specified maximum number of virtual machines that may be executing on a computing system at a given time.

The example method of FIG. 5 also includes identifying (506), by the life cycle management module (126), a rule (302, 304, 306) that is to be excluded from the rule set (300). In the example method of FIG. 5, identifying (506) a rule (302, 304, 306) that is to be excluded from the rule set (300) may be carried out, for example, by receiving user input identifying a rule (302, 304, 306) that is to be excluded from the rule set (300), by determining that a rule is no longer valid based on the expiration of a predetermined life length, and so on. In such an example, the rule (302, 304, 306) that is to be excluded from the rule set (300) may have been replaced by an updated rule, the rule (302, 304, 306) that is to be excluded from the rule set (300) may no longer apply as the computing system has changed, or the rule (302, 304, 306) that is to be excluded from the rule set (300) may need to be removed from the rule set (300) for other reasons as will occur to those of skill in the art.

The example method of FIG. 5 also includes excluding (508) from the rule set (300), by the life cycle management module (126), the rule (302, 304, 306) that is to be excluded from the rule set (300), including removing the rule (302, 304, 306) from the linkage set of all other rules (302, 304, 306). In the example method of FIG. 5, a rule that is set to the exclusion life cycle state cannot be included in the linkage set of any other rules. As such, when a rule is transitioned into the exclusion life cycle state, the life cycle management module (126) can inspect the linkage sets for all other rules in the rule set (300) and remove any reference to the excluded rule that is found in the linkage set of a rule. In addition, when resolving linkages for excluded rules, if a customization is based on a rule which is transitioning to exclusion states, and another rule has been linked as a replacement rule, the customized rule is re-linked to the rule that replaced the excluded rule. If no new rule exists, then the link is broken and the customized rule stands alone.

Figure 6:
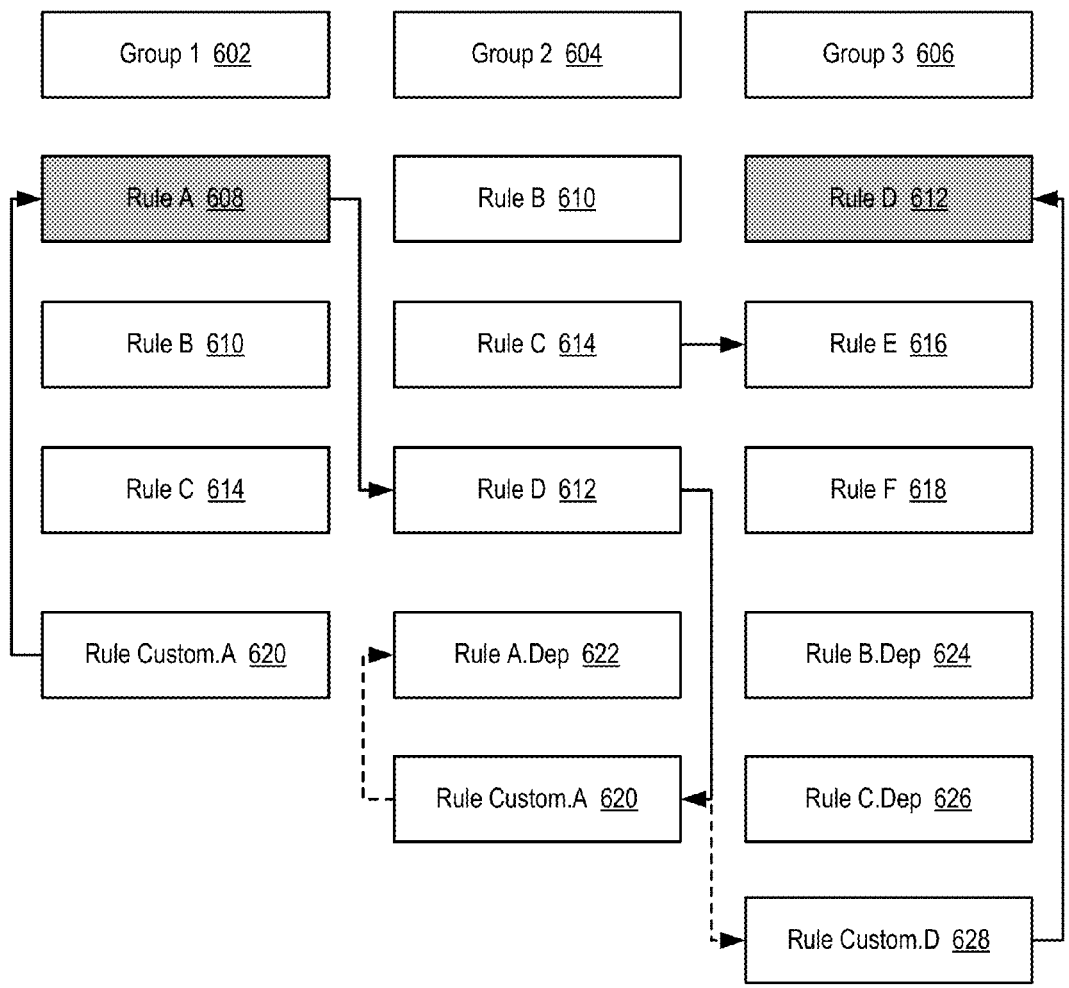
FIG. 6 sets forth a block diagram illustrating the state of a rule set at various points in the life cycle of the rule set according to embodiments of the present invention.

For further explanation, FIG. 6 sets forth a block diagram illustrating the state of a rule set at various points in the life cycle of the rule set. In the example of FIG. 6, a set of rules is shown at three points in time, labeled as Group 1 (602), Group 2 (604), and Group 3 (606). In Group 1 (602), three rules (608, 610, 614) are initially deployed. The three rules are Rule A (608), Rule B (610), and Rule C (614). The example of FIG. 6 illustrates an example in which a user creates a new rule (620) that represents a customization of Rule A (608). In such an example, Rule Custom.A (620) will supersede Rule A (608) such that Rule A is inactive, as noted using the shading of Rule A (608) in FIG. 6.

The example of FIG. 6 illustrates the state of the rule set at a second point in time, labeled as Group 2 (604). Group 2 (604) includes some of the same rules as were contained in Group 1 (602), including Rule B (610) and Rule C (614) which have not been modified or deactivated in Group 2 (604). In Group 2 (604), a new rule has been created which is labeled as Rule D (612). Rule D (612) represents a replacement of Rule A (608) from Group 1 (602). Because Rule D (612) replaces Rule A (608), Rule A (608) can be deprecated as shown with Rule A.Dep (622). While Rule A (608) is deprecated, a rule that was created as a customization of Rule A (608), which is Rule Custom.A (620), may still be an active and deployed rule. Rule D (612), which is a Replacement for Rule A (612), is currently inactive due to the fact that Rule Custom.A (620) is still active. Because Rule Custom.A (620) superseded Rule A (608), Rule Custom.A (620) also supersedes Rule D (612). In Group 2 both Rule A.Dep (622) and Rule D (612) are inactive due to Rule Custom.A (620). If Rule Custom.A (620) was ever deprecated or made inactive, then Rule D (612) in Group 2 would become the active rule.

The example of FIG. 6 illustrates the state of the rule set at a third point in time, labeled as Group 3 (606). Group 3 (606) includes one of the rules, Rule D (612), that was found in Group 2 (604). In Group 3 (606), two of the rules (610, 614) from Group 2 (604) have been deprecated as noted by Rule B.Dep (624) and Rule C.Dep (626). In Group 3 (606), a new rule labeled as Rule E (616) has been created and activated to replace Rule C (614) from Group 2 (604). Rule B (610) from Group 2 (604) was simply deprecated with no replacement rule created in its place. Furthermore, Rule A.Dep (622) is no longer in the rule set as illustrated by its absence from Group 3 (606). In such an example, Rule A.Dep (622) has been excluded from the rule set and removed from the rule set. Group 3 (606) also illustrates that a customization of Rule D (612), labeled as Rule Custom.D (628), has been created and Rule D (612) has been deactivated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of life cycle management of rule sets, each rule set including rules for managing the operation of a computing system, the method comprising:
    identifying, by a life cycle management module, a rule life cycle state for each rule in the rule set, wherein the rule life cycle state specifies the current deployment status of the rule;
    identifying, by the life cycle management module, a linkage set for each rule in the rule set, wherein the linkage set identifies versions of the rule that are in a different rule life cycle state; and
    updating, by the life cycle management module, the rule set, including:
        updating the rule life cycle state for one or more rules in the rule set; and
        updating the linkage set for one or more rules in the rule set.

2. The method of claim 1 further comprising:
    receiving, by the life cycle management module, an updated rule set;
    wherein updating the rule set includes updating the rule set in dependence upon the updated rule set.

3. The method of claim 1 further comprising:
    receiving, by the life cycle management module, user input identifying an update to apply to an existing rule in the rule set;
    wherein updating the rule set includes updating the rule set in dependence upon the user input identifying an update to apply to an existing rule in the rule set.

4. The method of claim 1 further comprising:
    identifying, by the life cycle management module, a rule that is to be excluded from the rule set; and excluding from the rule set, by the life cycle management module, the rule that is to be excluded from the rule set, including removing the rule from the linkage set of all other rules.

5. The method of claim 1 wherein the rule life cycle state is one of:
inception, revision, activation, deprecation, or exclusion.

6. The method of claim 1 wherein the rule set is a configuration rule set that includes rules specifying how the computing system must be configured.

7. An apparatus for life cycle management of rule sets, each rule set including rules for managing the operation of a computing system, the apparatus comprising a computer processor, a computer memory operatively coupled to the computer processor, the computer memory having disposed within it computer program instructions that, when executed by the computer processor, cause the apparatus to carry out the steps of:
identifying, by a life cycle management module, a rule life cycle state for each rule in the rule set, wherein the rule life cycle state specifies the current deployment status of the rule;
identifying, by the life cycle management module, a linkage set for each rule in the rule set, wherein the linkage set identifies versions of the rule that are in a different rule life cycle state; and
updating, by the life cycle management module, the rule set, including:
updating the rule life cycle state for one or more rules in the rule set; and
updating the linkage set for one or more rules in the rule set.

8. The apparatus of claim 7 further comprising computer program instructions that, when executed by the computer processor, cause the apparatus to carry out the step of:
receiving, by the life cycle management module, an updated rule set;
wherein updating the rule set includes updating the rule set in dependence upon the updated rule set.

9. The apparatus of claim 7 further comprising computer program instructions that, when executed by the computer processor, cause the apparatus to carry out the step of:
receiving, by the life cycle management module, user input identifying an update to apply to an existing rule in the rule set;
wherein updating the rule set includes updating the rule set in dependence upon the user input identifying an update to apply to an existing rule in the rule set.

10. The apparatus of claim 7 further comprising computer program instructions that, when executed by the computer processor, cause the apparatus to carry out the steps of:
identifying, by the life cycle management module, a rule that is to be excluded from the rule set; and
excluding from the rule set, by the life cycle management module, the rule that is to be excluded from the rule set, including removing the rule from the linkage set of all other rules.

11. The apparatus of claim 7 wherein the rule life cycle state is one of:
inception, revision, activation, deprecation, or exclusion.

12. The apparatus of claim 7 wherein the rule set is a configuration rule set that includes rules specifying how the computing system must be configured.

13. A computer program product for life cycle management of rule sets, each rule set including rules for managing the operation of a computing system, the computer program product disposed upon a non-transitory computer readable medium, the computer program product comprising computer program instructions that, when executed, cause a computer to carry out the steps of:
identifying, by a life cycle management module, a rule life cycle state for each rule in the rule set, wherein the rule life cycle state specifies the current deployment status of the rule;
identifying, by the life cycle management module, a linkage set for each rule in the rule set, wherein the linkage set identifies versions of the rule that are in a different rule life cycle state; and
updating, by the life cycle management module, the rule set, including:
updating the rule life cycle state for one or more rules in the rule set; and
updating the linkage set for one or more rules in the rule set.

14. The computer program product of claim 13 further comprising computer program instructions that, when executed, cause a computer to carry out the step of:
receiving, by the life cycle management module, an updated rule set;
wherein updating the rule set includes updating the rule set in dependence upon the updated rule set.

15. The computer program product of claim 13 further comprising computer program instructions that, when executed, cause a computer to carry out the step of:
receiving, by the life cycle management module, user input identifying an update to apply to an existing rule in the rule set;
wherein updating the rule set includes updating the rule set in dependence upon the user input identifying an update to apply to an existing rule in the rule set.

16. The computer program product of claim 13 further comprising computer program instructions that, when executed, cause a computer to carry out the steps of:
identifying, by the life cycle management module, a rule that is to be excluded from the rule set; and
excluding from the rule set, by the life cycle management module, the rule that is to be excluded from the rule set, including removing the rule from the linkage set of all other rules.

17. The computer program product of claim 13 wherein the rule life cycle state is one of: inception, revision, activation, deprecation, or exclusion.

18. The computer program product of claim 13 wherein the rule set is a configuration rule set that includes rules specifying how the computing system must be configured.

19. The computer program product of claim 13 wherein the computer readable medium comprises a storage medium.

* * * * *